United States Patent [19]
Herrell et al.

[11] Patent Number: 5,301,287
[45] Date of Patent: Apr. 5, 1994

[54] USER SCHEDULED DIRECT MEMORY ACCESS USING VIRTUAL ADDRESSES

[75] Inventors: Russ W. Herrell; Thomas P. Morrissey, both of Fort Collins, Colo.

[73] Assignee: Hewlett-Packard Company, Palo Alto, Calif.

[21] Appl. No.: 18,479

[22] Filed: Feb. 16, 1993

Related U.S. Application Data

[63] Continuation of Ser. No. 492,518, Mar. 12, 1990, abandoned.

[51] Int. Cl.$^5$ ............................................. G06F 15/00
[52] U.S. Cl. ..................... 395/400; 395/425; 395/325; 395/600; 364/DIG. 1; 364/242.3; 364/242.31; 364/242.32; 364/246.3; 364/256.3; 364/256.4
[58] Field of Search ................ 395/325, 600, 400, 425

[56] References Cited

U.S. PATENT DOCUMENTS

| | | | |
|---|---|---|---|
| 4,272,819 | 6/1981 | Katsumata et al. | 364/200 |
| 4,564,900 | 2/1984 | Smitt | 395/325 |
| 4,638,426 | 1/1987 | Chang et al. | 364/200 |
| 4,649,498 | 3/1987 | Kedem et al. | 364/518 |
| 4,787,026 | 11/1988 | Barnes et al. | 364/200 |
| 4,797,812 | 1/1989 | Kihara | 364/200 |
| 4,799,150 | 1/1989 | Bui | 395/325 |
| 4,807,116 | 2/1989 | Kateman et al. | 395/200 |
| 4,821,180 | 4/1989 | Gerety et al. | 395/275 |
| 5,001,624 | 3/1991 | Hoffman et al. | 395/375 |
| 5,088,033 | 2/1992 | Binkley et al. | 395/500 |
| 5,113,523 | 5/1992 | Colley et al. | 395/800 |
| 5,151,895 | 9/1992 | Vacon et al. | 370/85.1 |

FOREIGN PATENT DOCUMENTS 0210640 2/1987 European Pat. Off. .

OTHER PUBLICATIONS

Kaplinsky et al., "Memory Controller Gives a Microporcessor a Big Mini's Throughput" Electronic Design, Aug. 23, 1984, pp. 153–160, 162, 164.

Primary Examiner—Paul V. Kulik
Assistant Examiner—Wayne Amsbury
Attorney, Agent, or Firm—Cynthia S. Baan

[57] ABSTRACT

The present invention relates to an intelligent direct memory access (DMA) controller which interprets user commands from a host system, translates virtual addresses from the user applications program to physical addresses, and retrieves blocks of data from the main system memory at the request of the user's code, rather than at the request of the kernel code of the host system. This is accomplished by representing the data processing commands of the user and the data associated therewith as respective command/pointer packets comprised of data processing commands and virtual pointers to the associated data in virtual memory space of the user's host system. The virtual pointers of the command/pointer packets may then be translated to physical pointers for purposes of identifying physical addresses within the main memory at which the associated data is located. The associated data may then be read from the physical address in the main memory without interrupting the host processor. Techniques are also disclosed whereby the attributes of virtual memory systems such as page fault and access fault correction may be maintained in conjunction with the user scheduled DMA technique of the invention.

42 Claims, 2 Drawing Sheets

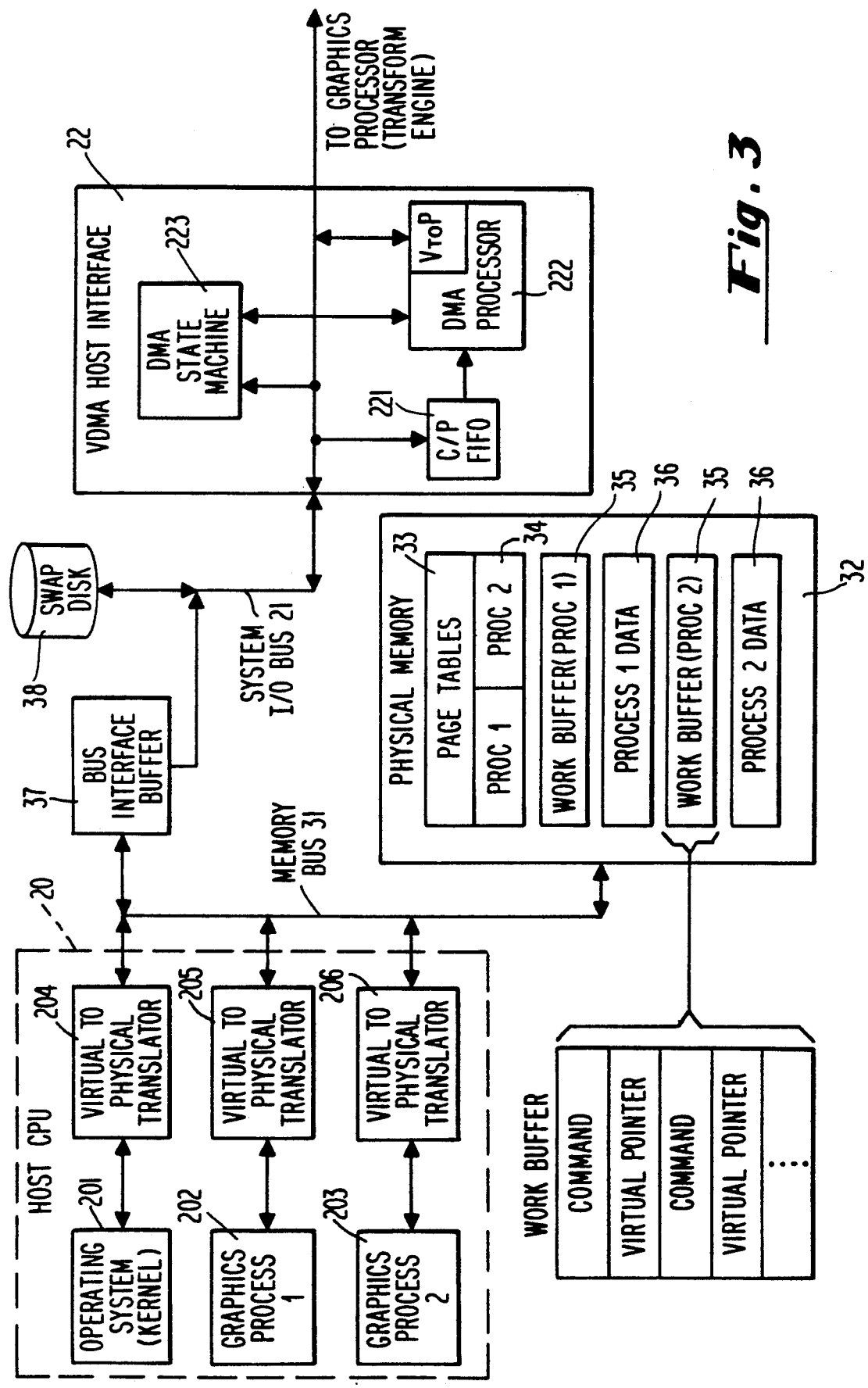

USER SCHEDULED DIRECT MEMORY ACCESS USING VIRTUAL ADDRESSES

This is a continuation of copending application Ser. No. 07/492,518 filed on Mar. 19, 1990, now abandoned.

BACKGROUND OF THE INVENTION

1. Field of the Invention

The present invention relates to a method and apparatus for providing direct access by an external data processing system to data stored in the main memory of a host system, and more particularly, to an interface method and apparatus for providing direct memory access by an external data processing system, such as a graphics subsystem, to virtual memory of the host system by transferring the contents of main memory of the host system at a location in virtual memory space specified by the user to the external data processing system under the user's control.

2. Description of the Prior Art

Generally, data transfer between the processor of a host system and an external data processing device is performed via an input/output (I/O) attachment under direct control of a program being run by the host processor. Typically, each byte or word of data requires the execution of several instructions to transfer. However, some I/O devices require higher data transfer rates than are achievable with this technique. For such devices, the I/O attachment may use a data transfer process known as direct memory access (DMA). DMA allows the direct transfer of data between the host processor memory and the I/O attachment without the necessity of executing instructions in the host processor. In particular, during DMA the host processor first initializes the DMA controller circuitry by storing a count and a starting memory address in its registers. Once started, DMA proceeds without further host processor intervention (except that an interrupt may be generated upon completion of the DMA operation), and hence data transmission is handled without the need to execute further instructions in the host processor.

I/O attachments using such a DMA technique are known and generally incorporate circuitry of the type shown in FIG. 1. The host processor of the DMA controller of FIG. 1 sets the address counter and counter registers 10 and 12. The signal Bus Cycle is assumed to define the interval of time during which the addresses are presented and data are exchanged on the bus. The DMA controller also connects to the I/O attachment with the lines Transmit Request and Request Granted. During operation, when the I/O attachment wishes to use a bus cycle, it raises the voltage on the line Transmit Request. If the DMA count register 12 is nonzero, the signal is placed on the Bus Request line to the host processor. The host processor hardware periodically examines this signal, and when it is of a high logic level the host processor waits until the end of the current bus cycle, stops any further bus activity, places its address and data line drivers in the high-impedance state, and raises the voltage of the line Bus Grant. The host processor is thus effectively isolated from the bus during bus cycles granted to the DMA controller. When a high logic level of Bus Grant is sensed by the DMA controller, it places the contents of its address counter register 10 on the Address lines and signals the I/O attachment on Request Granted that it may use the current bus cycle for transmission of data. The I/O attachment itself may thus drive the bus lines that determine the direction of data transfer, or additional circuitry in the DMA controller may drive these lines. As long as Transmit Request is held at a high logic level, consecutive bus cycles may be used by the I/O attachment. Such a technique is known as "cycle stealing".

The circuitry of prior art FIG. 1 is capable of using successive bus cycles ("burst mode") or using bus cycles intermittently. The choice depends on the data transfer rate of the I/O attachment. In fact, the processor of the host system often must use several bus cycles in preparation for relinquishing the bus by generating Bus Grant, and must use several bus cycles after regaining the bus. These cycles are unproductive in that they do not contribute to instruction execution or data transfer. Therefore, DMA transfers that use consecutive bus cycles make more efficient use of the bus.

Thus, in order to reduce the load on the host processor when transferring data to an external data processing system, it is known to use DMA to fetch data from the main memory of the host system and to pass it to the external data processing system without requiring additional processor instructions. However, such prior art DMA techniques have been typically initiated by the kernel software in the host processor to guarantee the integrity of multi-user memory space and have not been initiated by the user's code operating on the host system. As a result, when a user applications program of the host system calls for processing of large blocks of data as in conventional graphics processing or networking systems, user scheduled DMA has not been possible. Rather, access to the main memory of the host system has been typically provided only through system software (or kernel) control in the host processor, thereby significantly slowing the overall data transfer time of the system and complicating user programming. Hence, it has heretofore been extremely difficult to perform real-time manipulations of graphics and other such complex data profiles under user direction via a DMA interface.

Accordingly, there is a long-felt need in the art for a process and apparatus which enables an external process to access data in the main memory of a host system under user control whereby the time required for data transfer to the external process or data processing system can be substantially reduced so as to allow real-time data manipulation without losing system security. The present invention has been designed for this purpose.

SUMMARY OF THE INVENTION

The above-mentioned long-felt need has been met in accordance with the present invention, which relates to an intelligent direct memory access (DMA) controller which interprets commands from a host system in virtual memory space, translates virtual addresses to physical addresses, and retrieves blocks of data from the main system memory at the user's request, rather than at the request of the kernel software. This allows for rapid data access to be accomplished at the user's request, not the kernel's, while maintaining access security in a multi-user system.

In accordance with the invention, an interface device is provided for transferring data processing commands and associated data between a user's host system having a main memory and an external data processing system. The interface device in accordance with the invention comprises means for representing the data processing commands and associated data as respective command- /pointer packets comprised of data processing commands and virtual pointers to the associated data in virtual memory space of the user's host system. The virtual pointers of the command/pointer packets are then translated by translating means to physical pointers for purposes of identifying physical addresses within the main memory at which the associated data is located so that the associated data may then be read from or written to the physical address in the main memory by reading and writing means. Such a direct memory access system is preferably used in conjunction with a graphics subsystem connected to the user's host system, whereby the data processing commands are graphics commands and the associated data comprises graphics primitive data. However, the external data processing system may be a communications network or some other such system in which direct memory access is desirable.

In a preferred embodiment, the functions of the representing means may be performed by the host processor, while the functions of the translating means may be performed by a DMA processor having at least one shadow page table which is updated by the host processor to contain current physical pointers corresponding to the virtual pointers of the command/pointer packet. Preferably, a shadow page table is provided for each user controlled process of the host system, each shadow page table being privileged to the user. Missing pages in the shadow page tables may be updated by interrupting the host processor so that its kernel software can swap in the missing page from an external memory. Also, in a preferred embodiment the interface device of the invention includes synchronizing means for synchronizing the processing of the host system to DMA read and write accesses of the main memory. Moreover, data consistency techniques are preferably implemented by the host system to prevent attempted data accesses before the main memory has been updated after the previous access.

In accordance with another aspect of the invention, an interface device is provided for transferring graphics commands and graphics primitives between a user's host system having a main memory and a graphics subsystem. This interface device preferably utilizes a command/pointer protocol by using means for representing the graphics commands and graphics primitives as respective command/pointer packets comprising the graphics commands and virtual pointers to the graphics primitive data in virtual memory space of the user's host system. In conjunction with this command/pointer protocol, means are provided for translating the virtual pointers to physical pointers which identify physical addresses within the main memory at which the graphics primitives are located. Preferably, the translating means comprises a DMA processor having a shadow page table for each user controlled process of the user's host system, and each shadow page table is updated by a processor driven operating system of the user's host system, in response to an indication that the graphics primitives are not in the main memory, so as to contain current physical pointers corresponding to the virtual pointers. The translating means further comprises a command/pointer packet buffer for sequentially storing the command/pointer packets for parsing by the DRA processor and DMA state means responsive to the DMA processor for initiating a read or a write of the graphics primitives from main memory at the physical addresses. Synchronizing means may also be provided for synchronizing the user's host system to reads and writes initiated by the DMA state means.

The invention also comprises a method for providing direct memory access by an external data processing system to data stored in a main memory of a user's host system in response to a user's data processing command. This method generally comprises the steps of:

preapproving all direct memory accesses by the external data processing system requested by the user in the user's data processing command;

assembling a series of command/pointer packets for each user process, the command/pointer packets comprising the user's data processing command and a virtual pointer in virtual memory space of the user's host system to data in the main memory for use in processing of the user's data processing command;

parsing each command/pointer packet to obtain the user's data processing command and the virtual pointer;

writing the user's data processing command to an input of the external data processing system;

translating the virtual pointer into a corresponding physical pointer to an actual memory location in the main memory; determining a word count identifying the length of the data; and transferring to an input of the external data processing system a number of words of the data corresponding to the word count, the data transfer starting at an address in the main memory identified by the physical pointer.

The method of the invention may also include the step of synchronizing the processing by the user's host system to the data transferring step to prevent attempted DMA to "dirty" memory. Data consistency problems are also prevented by flushing all display list elements as well as the user's data cache to main memory before the data transfer is attempted. Also, all shadow page table entries to the main memory may be flushed both before and after the virtual to physical pointer translation, where the translation includes the steps of:

performing table lookup in a translation lookaside buffer to find the physical address of the data associated with each user's data processing commands;

when the translation lookaside buffer does not contain the physical address, searching a shadow page table;

if the physical address is found in the shadow page table, adding a corresponding virtual to physical translation to the translation lookaside buffer;

writing the physical address to an address register of a DMA state device; and repeating the table lookup step.

However, should a page or protection fault be encountered during the translating step, the translating step is suspended and an interrupt is transmitted to the user's host system so that a page swap or some other remedial operation may be performed. Moreover, this processing is performed by the host processor without the necessity of a task swap, thereby significantly increasing the response time of the system of the invention. Thus, the characteristics of a virtual memory system are maintained in accordance with the invention, while the processing efficiency of user scheduled DMA without kernel control also is made possible.

BRIEF DESCRIPTION OF THE DRAWINGS

The objects and advantages of the invention will become more apparent and more readily appreciated from the following detailed description of the presently preferred exemplary embodiments of the invention taken in conjunction with the accompanying drawings of which:

FIG. 3 schematically illustrates a user-scheduled direct memory access system for interfacing a host system to a graphics subsystem in accordance with the invention.

DETAILED DESCRIPTION OF THE PRESENTLY PREFERRED EMBODIMENTS

The inventors of the subject matter disclosed and claimed herein have satisfied the above-mentioned long-felt needs in the art by developing a host interface process and apparatus which allows an external data processing system, such as a graphics subsystem, to access data directly from main memory of the host system under user control without requiring the kernel to initiate and control each memory access.

In accordance with the invention, data may be transferred directly to and from the external data processing system from the main memory of the host system in response to the user's commands in virtual memory space, thereby reducing the bandwidth requirements of the interface. As a result, the host processor no longer must spend valuable computation time performing routine data copies. Also, since the host's user level software can initiate direct access to memory using virtual addresses, subrouting calls to kernel services are not required. Moreover, the above is accomplished in accordance with the invention without losing the benefits of conventional page swapping and virtual memory functions and protections.

An interface device with these and other beneficial features in accordance with presently preferred embodiments of the invention will be described with reference to FIGS. 2 and 3. As shown, the invention is described generally in conjunction with a host processing system and a graphics subsystem of the host system; however, it will be appreciated by those of ordinary skill in the art that the invention may be used in other environments as well. Moreover, the description given herein is for exemplary purposes only and is not intended in any way to limit the scope of the invention. All questions regarding the scope of the invention may be resolved by referring to the appended claims.

Figure 2:
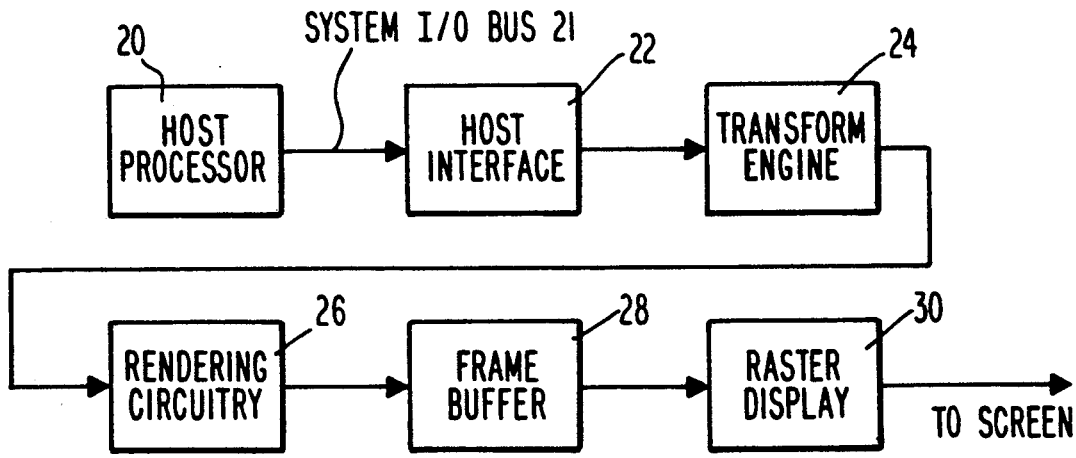
FIG. 2 schematically represents a conceptual block diagram of a host system and graphics processing system connected by a host interface embodying the present invention.

FIG. 2 shows a host processing system interfaced with a graphics subsystem by a host interface incorporating the invention. As shown, the processing system comprises a host processor 20 which is interfaced via system I/O bus 21 and VDMA host interface 22 to a graphics transform engine 24. The output of the transform engine 24 is input to graphics rendering circuitry 26 and then to a frame buffer 28. The output of the frame buffer 28 is then received by raster display 30 and output to a CRT screen, for example. As will be described in detail below, the present invention is particularly directed to the host interface circuitry 22 of FIG. 2 and the direct memory access (DMA) process performed by host interface circuitry 22 for allowing data to be transferred directly between the main memory of the host processor 20 and the graphics subsystem including transform engine 24, rendering circuitry 26, frame buffer 28 and raster display 30 without the immediate intervention of the software program (or kernel) of host processor 20.

For the DMA of the invention to be responsive to user input to the host processor 20, the user input must either be in a low level language (such as Assembly language) which directly references actual memory addresses, or as is usually the case, the user input must be converted from addresses in user memory space (hereinafter referred to as "virtual memory" space) to physical memory addresses. Such virtual memory systems are well known, and a system of such a type is said to have virtual memory if the address space of a process (i.e., the addresses that generate reference instructions, data, and the like) is not identical to the physical address space (i.e., the machine address as actually occupied by the process while running). A run-time translation must therefore take place from the virtual address space of the process to the physical address space of the main memory of the host system. This is typically done with the help of specially designed virtual memory hardware. It is in such virtual memory space wherein the users of the host system make their graphics processing demands for which DMA is implemented in accordance with the invention.

In general, mapping mechanisms are used for implementing virtual memory so as to provide the capability of dynamic relocation of data. Paging, segmentation and a combination of the two are the three common schemes for providing a dynamic virtual memory. The device of the invention is intended to be used in conjunction with any of these mapping mechanisms, and the modifications to such systems for purposes of implementing the user scheduled DMA process in accordance with the invention will be described in more detail below.

FIG. 3 illustrates a block diagram of the various components of the invention. As shown, the system of the illustrated embodiment of the invention interfaces a host central processing unit (CPU) 20 to a graphics processor (not shown) over a system I/O bus 21. The host CPU 20 generally comprises an operating system (or kernel) 201 for performing processing functions and software driven memory access. The host CPU 20 runs one or more user applications programs such as graphics processes 1 and 2 illustrated as elements 202 and 203, respectively. Since each user of the host CPU 20 operates in his or her own virtual memory space, memory mapping is provided by virtual to physical translators 204, 205 and 206 for respectively translating the virtual addresses output by the operating system 201 and graphics processes 1 and 2 to physical addresses. The translated physical addresses are then sent across memory bus 31 for accessing main (physical) memory 32 associated with the host CPU 20. Preferably, main memory 32 has stored therein system privileged page tables 33 and user privileged page tables 34 for graphics processes 1 and 2. Main memory 32 also preferably includes work buffers 35 for each process as well as data sections 36 for storing the associated data for each process. As will be described in further detail below, each work buffer 35 respectively stores the commands and virtual pointers to data associated with the commands until the commands and data are passed downstream to the VDMA host interface 22 of the invention.

Communications between memory bus 31 and the VDMA host interface 22 are accomplished across system I/O bus 21 via bus interface buffer 37. Bus interface buffer 37 generally provides for noninterfering bidirectional data transfer between the memory bus 31 and system I/O bus 21 and also coordinates transfers of data between main memory 32 and auxiliary memory (swap disc) 38 or VDMA host interface 22. In particular, the bus interface buffer 37 functions to link the system memory bus 31 with the system I/O bus 21 during page swaps with external memory (swap disk) 38 and during DMA data transfer with VDMA host interface 22 in accordance with the invention.

VDMA host interface 22 preferably comprises a command/pointer (C/P) queue or FIFO 221 which stores a series of command/pointer words received from host CPU 20 across system I/O bus 21 in accordance with the invention. The received command/pointer words are then parsed by the DMA processor 222, and the virtual pointers are translated to physical pointers for accessing main memory 32 using DMA in accordance with the invention. For this purpose, DMA processor 222 includes access to user privileged virtual to physical translation tables (shadow page tables) which may be located in main memory 32 and maintained by the kernel 201 as will be described below. Finally, VDMA host interface 22 also includes a DMA state machine 223 which provides DMA read and write requests to main memory 32 from VDMA host interface 22.

The embodiment thus arranged is preferably used in conjunction with a command/pointer (C/P) architecture in which data packets (C/P packets) containing a command and virtual pointers to the data associated with the command are converted to conventional command/data (C/D) packets for processing by the graphics processor, or on the other hand, packets may be sent directly to the graphics processor. C/D packets generally consist of one or more 32-bit words of command followed by zero or more words of data. C/P packets, on the other hand, are very similar to C/D packets except that the actual data is replaced by a pointer to the data. The VDMA host interface 22 will then de-reference this pointer and acquire the data associated with a command directly from main memory 32 using DMA. However, since the pointer is identified by the user in virtual memory space, the virtual pointer must be converted to a physical pointer before DMA can be performed in accordance with the invention.

Figure 1:
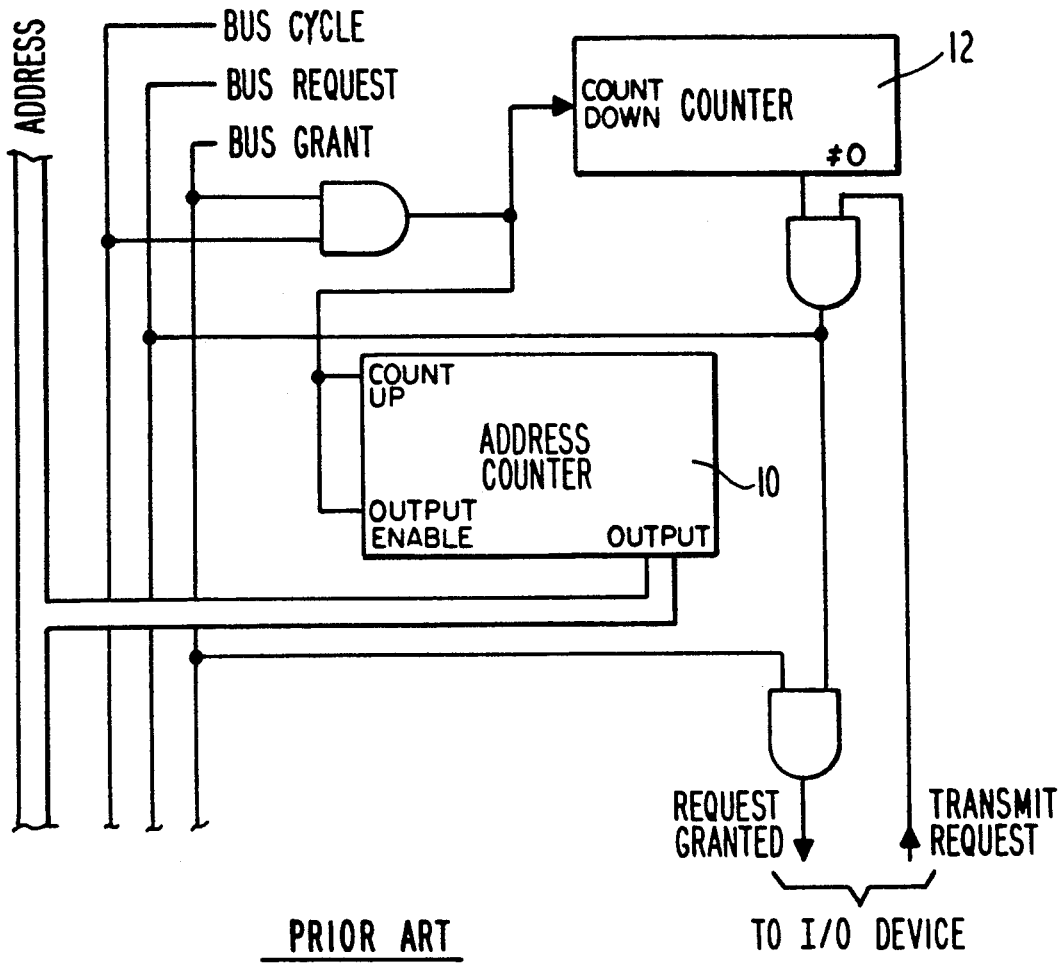
FIG. 1 schematically illustrates a prior art direct memory access (DMA) controller.

Accordingly, the pointer passed to the graphics hardware in a C/P packet in accordance with the invention is not a conventional (physical) pointer but is a virtual, or logical pointer. Hence, the DMA activity in accordance with the invention is herein referred to as virtual DMA, or VDMA for short. However, since only physical addresses appear on the system I/O bus 21, the term VDMA is really only useful to denote that the original source of the address for the DMA was a virtual address. The VDMA host interface 22 of the invention must translate or map the virtual address to a physical address before it can de-reference the pointer. Thus, VDMA is not a special type of bus cycle as described with reference to prior art FIG. 1.

The VDMA process in accordance with the invention functions generally as follows. Initially, host CPU 20 gives blanket approval to all DMA by VDMA host interface 22 for a particular process, thereby obviating the need for kernel calls each time DMA is performed. The user applications software (i.e., graphics process 1 or 2) in the host CPU 20 then assembles a work buffer 35 in main memory 32 containing a series of C/P packets for each graphics process. The contents of the work buffer 35 are then transferred via bus interface buffer 37 to C/P FIFO 221, where the data are then read by DMA processor 222. The DMA processor 222 then writes the appropriate command word into an output command/data queue (not shown) and translates the virtual pointer to a physical address which is then written to DMA state machine 223 along with a word count. DMA state machine 223 then reads the requested data from main memory 32, and the transferred data are output to the output command/data queue to complete the C/D packet therein. While the DMA state machine is busy transferring in blocks of data associated with the first command, the VDMA processor 222 reads the next C/P packet from the C/P FIFO. Then, while the VDMA host interface 22 hardware is busy parsing the first buffer of C/P packets, the user's software continues preparation of another C/P packet containing the user's graphics commands and data. The C/D packets in the output command/data queue may then be used by the graphics subsystem to perform the graphics manipulations requested by the user with the data specified by the user.

Thus, during operation using the above-mentioned C/P architecture, the host CPU 20 creates packets of commands and their associated data and writes these packets into a work buffer 35 in a locked page of memory, which is a physical page needing no virtual address translation. Then the host CPU 20 requests that VDMA host interface 22 perform a physical DMA to move the whole work buffer 35 into the C/P FIFO 221. As just noted, this is done by having the host CPU 20 create packets of commands and pointers to their associated data and writing these C/P packets to the work buffers 35 in main memory 32. The host CPU 20 then sends a command to the DMA processor 222, and this command is decoded so that a DMA transaction will be initiated whereby the contents of work buffers 35 are written into C/P FIFO 221 and read by the DMA processor 222. When the C/P packets are then decoded by the DMA processor 222, virtual DMA is used to obtain the data associated with a given graphics primitive.

However, since the host CPU 20 may also output C/D packets directly as described in related application Ser. No. 07/494,008 filed Mar. 15, 1990 assigned to the assignee of this invention and incorporated herein by reference, virtual to physical translations as herein described need not always be performed. In any event, all references to user graphics data in accordance with the invention may be via virtual pointers so that the VDMA host interface 22 of the invention must be capable of using virtual address to obtain the data associated with a graphics primitive. Therefore, the DMA processor 222 in accordance with the invention has its own virtual to physical translation capabilities and may, for example, include a translation lookaside buffer (TLB) for virtual to physical translations. As a result, the actual bus address is always a physical address.

The C/P packets and the process in accordance with the invention will now be described in more detail with continued reference to FIG. 3.

In prior art graphics systems, host CPU 20 generally only does two things for input polygons and polylines. Namely, the host CPU 20 locates the next element and determines that it is a polyline or a polygon and whether the data needs further processing before being sent to the graphics hardware. The data is then copied to a buffer. The present invention has been designed to substantially eliminate the amount of copying necessary in order to move the graphics data to the graphics hardware. In particular, the present invention operates upon the theory that if the graphics hardware could read the main memory 32 directly, the host CPU 20 would only have to send the graphics hardware an appropriate header and a pointer to the data. As noted above, this is accomplished in accordance with the invention by assembling the commands and their associated data as C/P packets.

A typical C/P packet in accordance with the invention preferably comprises a header, a graphics command, size information, count information, flag information, words/vertex information and a virtual pointer. The header indicates that the packet is a C/P packet, while the size information indicates the total number of words of polygon vertex data. The graphics command may indicate that the input data is a polygon, for example, while the count indicates the number of vertices of the polygon. The flag information may indicate the processing modes that are active for the input polygon, while the words/vertex information may indicate the number of words which may be used to describe each vertex. Finally, the virtual pointer may be a 32-bit address identifying the vertex data structure in accordance with the invention.

As noted above, DNA processor 222 converts all C/P packets to C/D packets by reading the required data from main memory 32 using DMA. Most graphics primitives in these packets are simple ones that need no further processing and may be simply copied to the graphics subsystem. However, some C/P packets for meshes, strips and long polylines, for example, require that the DMA processor 222 subdivide these graphics primitives into smaller ones that the graphics transform engine array of the graphics subsystem can more easily handle. This may be done in the DMA processor 222 because many vertices must be duplicated during the subdivision process, and the DMA processor 222 can simply reread the vertices from main memory 32. On the other hand, stages along the graphics pipeline of the graphics subsystem may allocate storage space for the duplicated vertices. The C/P packet data scheme improves the display list traversal performance of the graphics hardware by allowing each data element to traverse the memory bus 31 only once since it would be read directly from the main memory 32 by the graphics hardware. As a result, bandwidth requirements may actually drop. Moreover, one of the slowest links in the graphics rendering process may be significantly sped up. In addition, the VDMA host interface 22 of the invention is further beneficial in that the sizes of the C/P packets are available with each command sent from the host CPU 20; therefore, the entire C/P packet can be obtained at once using back to back accesses, thereby making this portion of the data transfer much more efficient. Such benefits are not generally possible in prior art graphics systems because bus cycles are created only in response to the actual processor requests for the data word, thereby limiting the fetch ahead to the additional words in the cache line of the processor.

However, the C/P packet data scheme of the invention requires utilization of hardware such as that herein described as well as some modification in the software of host CPU 20. For example, a synchronizing function may be implemented to synchronize the user's application program to the graphics hardware before any data is altered in the main memory 32, and the VDMA host interface 22 hardware may also guarantee that the caches of the host CPU 20 are consistent with main memory 32 for any DMA accesses. As an example, the data caches may be flushed by the user's application program before DMA is attempted to guarantee that the virtual DMA can access the data. Thus, the user's application program must not be allowed to alter data until after the DMA has read it. Hardware and software solutions to these problems will be discussed in more detail below.

Work buffers 35, although not a system requirement, may be used to facilitate data transfer. Such work buffers 35 preferably comprise arrays of 32-bit words, which may be, for example, 512 words long. The work buffers 35 are aligned on a 512 word boundary and thus do not cross a physical page boundary. The work buffers 35 also must be flushed from the cache of the host CPU 20 before being "swapped" whenever the graphics subsystem is running on a host CPU that does not allow cache snooping of DMA reads or does not use write-through pages, whereas if the work buffer 35 is allocated from write-through pages the cache need not be flushed before swapping. Moreover, it may be necessary for the software of the host CPU 20 to include state save and restore commands at the head of a work buffer 35 any time the controlling user is changed.

One skilled in the art will readily appreciate that since work buffer 35 is a logical entity, it does not necessarily exist in a specific address range or even in physical RAM. Accordingly, although shown as such, the work buffer 35 herein described need not be in the main memory 32 but may be part of a separate memory unit.

Work buffers 35 are used in the normal virtual DMA scenario in accordance with the invention as follows. Namely, the user's application program builds the work buffer 35 and flushes the cache of the host CPU 20 if necessary. The user's application program then acquires a lock to the graphics hardware if necessary. Then the user's application program checks the flags on a status register of DMA processor 222 to verify that any previous work buffer processing has been completed. When the DMA processor 222 is ready, the user's application program writes a work buffer link command, which is used by the host CPU 20 to signal the DMA processor 222 to transfer the data in either the C/P format or the C/D format from the work buffer 35 to the C/P FIFO 221 for processing. The work buffer link command is received by a command register of DMA processor 222, and the contents of the appropriate work buffer 35 are read in and parsed. Processing of the next buffer then begins.

Also in accordance with the invention, a PRIV flag may be set by the graphics hardware when the user's graphics command is written to a privileged register so that the software may always set this bit to zero. Thus, PRIV is a flag that, when set, indicates to the DMA processor 222 that the command was written to a privileged register. This is important because privileged commands must be written directly to privileged registers while nonprivileged commands may be included in a work buffer.

In a preferred embodiment of the invention, DMA processor 222 comprises a Texas Instruments TMS320C30 microprocessor having a 60 nanosecond cycle time. Of course, other microprocessor devices may be used in accordance with the invention without departing from the spirit or scope of the invention as defined by the appended claims. However implemented, the DMA processor 222 preferably is programmed to perform the functions to be described below.

The DMA processor 222 preferably services host requests from the host CPU 20. In particular, when host CPU 20 writes a command into the message registers of the DMA processor 222, the DRA processor 222 will read the command and take the appropriate action to service the request.

The DMA processor 222 must also parse the C/P FIFO 221 as described above. This is accomplished by decoding the type of each packet in C/P FIFO 221 and simply forwarding the C/D packets to the graphics processor. However, if a C/P packet is encountered, only the appropriate command header words are copied from the C/P FIFO 221 to the graphics processor. Included in the C/P packet is a virtual address which specifies the start of the data structure that should accompany the command to the graphics processor, plus a count that indicates the number of 32-bit words in the data structure. Using this information, the total data structure to be retrieved may be broken down into one or more bus transactions on one or more physical pages by the DMA processor 222. Each individual transaction of up to 512 words must be initiated separately by the DMA processor 222.

The DMA processor 222 also performs an address translation for virtual pointers by doing a TLB lookup in a translation lookaside buffer (TLB) to find the physical address of the data associated with the commands and then writing it to an address register of DMA state machine 223. If the TLB does not contain the entry (i.e., a TLB miss), the DMA processor 222 will search its shadow page table for the entry in the manner to be described below. To access a main memory location, the DMA processor 222 will then write the desired address to the address register of the DMA state machine 223 and write the proper MODE value into a control register of the DMA state machine 223. The DMA processor 222 will then activate the DMA state machine 223 to start a memory access cycle of main memory 32. The DMA processor 222 waits by checking a status bit of state machine 223 until the data is returned. The DMA processor 222 then reads in the data from an interface data register of the DMA state machine 223. Thus, DMA processor 222 activates the DMA transfer by calculating the count, the source address and the destination address and writing them into the registers of DMA state machine 223.

In a preferred embodiment, DMA processor 222 may comprise a small TLB having four fully associative entries; however, the size and the mapping may be changed by those skilled in the art to achieve the optimum cost/performance ratio. The TLB entries are created by the firmware of DMA processor 222 which searches the host's page table for the active graphics process and user. The invalidation of the TLB entry is done through a command sent from the host CPU 20 to the DMA processor 222. In addition, whenever a page is not resident in memory or a protection fault is encountered, the DMA processor 222 suspends DMA activity and contacts the host CPU 20 via an interrupt to repair the fault. Then, after the host CPU 20 repairs the fault, it restarts the DMA and the DMA processor 222 resumes the DMA activity from where it left off with a new TLB lookup. In short, the DMA processor 222 performs the functions previously performed by the operating system or kernel of the host system except that the large processing overhead of the operating system or kernel is no longer encountered, thereby resulting in significantly increased processing speed.

In a preferred embodiment, the host CPU 20 can pass commands to the DMA processor 222 via two channels. Namely, commands may be embedded in work buffers 35 as special C/P packets, or commands may be written into message registers of the DMA processor 222. The "message registers" as described herein are a set of internal registers within the DMA processor 222 which are accessible by the host CPU 20. The registers preferably include DMA command registers wherein the host CPU 20 writes the command word and DMA data registers wherein the host CPU 20 writes additional data words, if any, associated with the command. These registers are preferably multiply mapped into two different pages in the I/O address space, one page being privileged and accessible to only privileged processes, while the other page is accessible to any user. A PRIV bit will be set in the status register of DMA processor 222 by the interface hardware if the command is sent by a privileged user.

The scenario for the host CPU 20 to communicate with the DMA processor 222 via the message registers is as follows. The host CPU 20 checks that the DMA processor 222 is ready to accept another command. The host CPU 20 keeps polling the status bit until the DMA processor 222 is ready to accept another command. The host CPU 20 then writes the command as well as any related additional information into the message registers. The DMA processor 222 is then interrupted by the completion of the command register write. The DMA processor 222 then resets the DMA command ready bit and starts parsing the command. This procedure is then repeated for each command.

DMA processor 222 further contains several other registers for supporting its functions. For example, DMA processor 222 may include a DMA control register which functions to enable/disable interrupts on DMA faults and errors, to clear fault and error bits in the status register, to reset the DMA processor 222 and interface hardware, and to detect the state of all enable bits.

The DMA processor 222 also preferably includes one or more status registers which include numerous bits for determining the status of the VDMA host interface 22. For example, the status register may include an interrupt pending bit which indicates that the DMA processor 222 has signaled an interrupt to the host CPU 20, a page fault bit which indicates that a table walk encountered a non-resident page (where a fault address register contains the faulted virtual address), an access fault bit which indicates that an access violation has occurred during DMA (where the fault address register contains the faulted virtual address), an access type bit which indicates whether the DMA faulting access was a read or a write, a privilege bit which indicates the privilege level at which the DMA was attempting the access, a table fault bit which indicates that a table walk encountered a non-resident table (where the fault address register contains the faulted virtual address which caused the table walk), a DMA ready bit which indicates that the DMA processor 222 is ready to process a command sent to it via the DMA command registers, a buffer ready bit which indicates that the DMA input buffer 221 is empty and that the DMA processor 222 has finished any commands read from there, a DMA error bit which indicates that an actual error has occurred during DMA processing (rather than just an expected virtual memory fault), error status bits which indicate the nature of the DMA error which has been logged by the DMA processor 222 (where the errors may include a bus error during DMA, identification of an illegal C/P packet, and/or an indication that buffer contents are out of synchronization), and any other such bits desired by one of ordinary skill in the art.

The above-mentioned fault address register typically contains the value of the last virtual address to fault the TLB of DMA processor 222. This register may also contain a valid virtual address when the DMA error bit is set and the accompanying DMA error status code is set to indicate a bus error.

The DMA processor 222 may further contain a root pointer register which returns the current root pointer used by the DMA processor 222. In a preferred embodiment, the 23 most significant bits of a 32-bit register may be the physical address of the start of the page table to be used, where these 23 bits may be set to all zeros whenever the DMA processor 222 has no valid root pointer. The nine least significant bits of the 32-bit register may be assigned to zero. This register is accessible only to privileged processes.

DMA state machine 223 functions as a bus controller to coordinate the data transfer among the host CPU 20, the main memory 32 and the DMA processor 222. In particular, the DMA state machine 223 functions to support host initiated read and writes to the graphics processor circuitry as well as DMA processor 222 initiated read and writes of the graphics processor circuitry. In addition, DMA state machine 223 may control the DMA processor 222 initiated block moves from the main memory 32 to the frame buffer 28, from the frame buffer 28 to the main memory 32, from the C/P FIFO 221 to transform engine 24, or from the main memory 32 to the C/P FIFO 221, the transform engine 24 or other processing circuitry of the graphics subsystem. In addition, the DMA state machine 223 may support host initiated block moves from one of the physical work buffers 35 to the input circuitry of the transform engine 24.

In a preferred embodiment of the DNA state machine 223, a plurality of registers are utilized to control the DMA operation. The following registers are discussed by way of example only and are not intended to be limiting. One skilled in the art may use any number of registers to perform the novel functions herein defined.

DMA state machine 223 may include a DMA state machine control register (or bus control register) which may be used to initiate the DMA transaction when the DMA processor 222 writes a proper value into this register. The DMA state machine control register may include a start bit which, when set, causes the DMA state machine 223 to start the DMA operation depending upon what mode field is written. When the DMA operation is completed, this bit will be cleared. Another field of the DMA state machine control register may indicate which work buffer pointer will be used to source the starting address of the DMA transaction. In addition, a mode field may be used to indicate what kind of transaction that the DMA state machine 223 needs to perform. This field is used by the DMA processor 222 only, and when the host CPU 20 writes the control word, this field should be written as zero. As noted above, the kinds of transactions may be block moves or single reads and writes as necessary. The DMA state machine control register may also include a count field which indicates the number of 32-bit words to be transferred. Of course, other control bits may be used by those skilled in the art.

Work buffer pointer registers containing physical pointers to two work buffers 35 locked by the kernel may also be used. Only the kernel is allowed to update these two registers. The particulars of this aspect of the invention are described in more detail in the aforementioned related application and incorporated herein by reference.

The DMA state machine 223 may also include an S/D register which is written by the DMA processor 222 to indicate the starting data buffer address in the main memory 32. This address may either be the source address or the destination address depending upon the mode being specified. The DMA state machine 223 will source this address to the address bus during the DMA bus cycle.

The DMA state machine 223 may further include an interface data register which serves as a buffer register when the DMA processor 222 tries to access the main memory 32. It also serves as a transceiver when the host CPU 20 tries to access the internal registers of the DMA processor 222. When the DMA state machine 223 is directed to perform a single read from main memory 32, the data returned may be latched in the interface data register and then read by the DMA processor 222. In addition, for a single write, the DMA processor 222 may place the data into this register prior to activation of the DMA state machine 223.

So that the VDMA host interface 22 may perform the necessary functions for handling virtual memory page or access faults, a fault address register is also preferably provided in internal RAM of DMA processor 222 so as to be available to host CPU 20. In particular, when a page fault or access fault occurs, the faulted virtual address will be written into this location before the DNA processor 222 interrupts the host CPU 20. If a bus error occurs during a bus transaction, on the other hand, this register will contain a valid virtual address. Therefore, this register is accessed by the host CPU 20 only if a DMA page fault, a DNA access fault, or a DMA error and bus error status bit is set.

The DMA state machine 223 may also contain a root pointer register which contains the current root pointer used by the DMA processor 222 to identify the physical starting address of the page tables 33 in the physical memory 32. This register is accessible only to privileged processes.

Finally, the DMA state machine 223 may include an I/O status register which is made available to the host CPU 20 and DMA processor 222. This register indicates whether an interrupt has been sent to the host CPU 20, whether a command is sent by a privileged process, whether the DMA processor 222 is ready for another command or is busy, whether a DMA operation has been successfully completed, whether the DMA faulting access was a read or a write, whether a table search encountered a non-resident page or an access violation occurred during table search, and the like.

The kernel and I/O driver support for the invention will now be described. Generally, the description will relate to updating of the page tables for address translations as well as software solutions for providing data consistency. However, it will be understood by those skilled in the art that other software solutions may be desirable in a particular embodiment of the invention. Hence, it is to be understood that the description herein is only for exemplary purposes and is not intended to limit the preferred embodiments of the invention.

Since in accordance with the invention the user may specify the desired graphics manipulations using virtual pointers to data stored in main memory 32, the graphics process must have access to virtual to physical translations of the virtual memory system of host CPU 20. Host CPU 20 generally keeps these translations in various tables in main memory 32, but the graphics process generally does not have direct access to these system page tables 33 because they are privileged. Accordingly, the DMA processor 222 of the present invention may use what are referred to herein as "shadow" page tables. These shadow page tables are maintained by the kernel I/O driver for the graphics processing subsystem such that each user of the host system has his or her own set of tables and only one user can be active on the graphics process at a time. The graphics subsystem may then read these translation tables to obtain translations and write these tables with modification and reference information as necessary. The kernel virtual memory system may supply the translation information at the kernel I/O driver's request, and the driver may return modification and reference information to the kernel when asked.

As previously noted, the DMA processor 222 may contain its own TLB to store virtual to physical translations for each user. As is known, an associative TLB greatly reduces the time required for searching the translation table. Preferably, a small TLB which offers high hit rates of greater than 90% is used to eliminate cold start problems of the system. However, since the TLB maps only one user's virtual memory space at a time, it should be noted that a user swap may purge the entire TLB.

In accordance with the invention, each entry of the TLB will preferably include bits for indicating that the TLB entry is valid, that the page associated with the entry may not be written, that the page has been modified (written) by someone, that portions of the virtual address have been assigned to by the page frame (which bits must match the appropriate bits of the virtual address being accessed), that a page frame has a physical address on which the associated page is found, and that the page is or is not cached as copy-back or write-through, or is not cached at all. Such a TLB entry creation may be performed by the graphics hardware or firmware. In other words, the DMA processor 222 may simply "walk" the shadow page tables for each user of the graphics system, or alternatively, the kernel driver may create entries directly via DMA processor commands or memory mapped registers.

Any time the kernel must move a page, re-map a page, or change protections or other attributes, all copies of the system page table data contained in any TLBs and shadow page tables must be invalidated. Thus, whenever the virtual memory requires modifications to pages mapped by the graphics subsystem, it must call the I/O driver and have it purge the TLB and alter the mapping in the shadow page tables accordingly. However, as would be apparent to one of ordinary skill in the art, only modifications to the page tables of the active graphics process are of interest to the graphics hardware, so it is recommended that the TLB purges be so qualified. Software purges may be communicated to the graphics subsystem only via the DMA command register of DMA processor 222 on the privileged page.

The shadow page tables from which the DMA processor 222 obtains virtual to physical translations in accordance with a preferred embodiment of the invention may be two level page table structures. The first level of the shadow page table (segment table) may be implemented such that each segment table contains 1024 entries, each of which may point to a second level table of 1024 page frame descriptors. In particular, each segment table entry may include a page table pointer which indicates the beginning of the associated page table, as well as a valid flag which indicates if the page table pointer points to a valid page table. The second level of the shadow page table (descriptor table) may also contain 1024 entries for each table. Each entry indicates the real address in RAM for a page frame descriptor, which may be a 4 Kbyte page. Thus, each second level table maps 4 Mbytes of virtual address space to physical addresses or to null addresses.

Each page descriptor table entry may include a page frame pointer which is a real pointer to the actual page frame (real RAM page address) for a given entry, a cache mode field which indicates the type of page associated with a given entry such as copy-back, write-through or non-cacheable, a flag indicating that the graphics subsystem has referenced the given page since the last time the bit was cleared, a "dirty bit" flag which is set if the graphics subsystem ever writes to any location on the given page, and a valid flag which indicates, when set, that the page frame pointer actually points to a real page. Of course, other arrangements are also possible as desired by those skilled in the art.

The creation and updating of the shadow page tables as herein defined are the responsibilities of the kernel I/O driver of the host CPU 20. When the DMA processor 222 attempts to walk the tables and the DMA processor 222 encounters a missing translation, it interrupts the host CPU 20 to indicate a page fault. The I/O driver of the host CPU 20 must then check the fault page to determine whether it is truly not resident, or if the shadow page table is just missing this entry. For this purpose, the I/O driver tries to locate the true mapping in the system tables. If the mapping exists, then the I/O driver adds the translation to the shadow tables. Using some heuristic method, the I/O driver may then attempt to map several additional pages in the same leaf of the shadow table. Once this table preloading is done, the I/O driver may restart the graphics subsystem DMA. As a result, the user's graphics application program should not ever be aware of a "shadow miss".

However, if the mapping does not exist, the I/O driver simply signals the user's graphics application program of the page fault. The graphics application program will then touch the page to fault it in and then call the driver to map the page to the shadow tables and restart the DMA. Also, as would be apparent to one of ordinary skill in the art, it may be possible to avoid having the graphics applications program touch the page if the kernel I/O driver can do this step instead. Then, once the shadow tables have been "fleshed out" by a previous traversal of the graphics data base, non-resident pages can be "clustered" by the kernel I/O driver. For instance, when a page fault does occur, the I/O driver can signal the user's graphics applications program (or do it itself) to touch "N" consecutive pages which are known to be part of the graphics data base because this data had previous mappings. However, the graphics process cannot do this arbitrarily without risking a segment violation.

When the kernel virtual memory system needs to modify the system page tables 33 in physical memory 32, it must call the I/O driver and ask it to signal the graphics subsystem to stop VDMA and then purge the shadow page tables in the TLB of DMA processor 222. The I/O driver will then mark the appropriate entries in the shadow page tables of DMA processor 222 as invalid and return the modification and reference information for the entries to the virtual memory system of the host CPU 20. The I/O driver will finally signal the graphics subsystem to continue processing. However, for the process to operate effectively, the complete shadow page table for the current graphics process controlling user should be resident in main memory 32, although one of ordinary skill in the art may find it possible to modify the shadow page table such that the complete shadow page tables need not rest in main memory 32 for an address translation.

As would also be apparent to one of ordinary skill in the art, cached page table data must be kept consistent with main memory 32 by having the driver flush the data cache both before and after modifying the shadow page tables unless hardware coherency is available. Moreover, since only one user is accepted at a time, the graphics subsystem will support only one root pointer in hardware. The kernel driver is responsible for providing this information to the graphics subsystem when a lock is given to a new graphics user. The root pointer may then be updated via a write to the DMA message registers of DMA processor 222. Such an update command may be accepted only from a privileged DMA command register.

The DMA processor 222 may also provide protection fault support whereby one or more signals are used that will allow the kernel of the host CPU 20 to pass a protection/page/TLB fault up to the graphics signal handler. The graphics applications program or the kernel I/O driver can then read registers to determine the type of fault. Since the graphics applications program is executed as the user process in the host CPU 20, protection faults can be created on the correct user process by having the graphics signal handler touch the page in question with an appropriate type of transaction. The subsequent protection fault should result in the page being re-mapped to allow the access, with the process being signaled or killed, as appropriate. On the other hand, it is also possible that the kernel I/O driver itself can be executed as the correct user process. If this is done, the driver will touch the necessary page or pages and create the proper results without actually calling the graphics program.

Page fault support can be handled in a manner similar to protection fault by passing a signal to the graphics program driver, which will attempt to touch the page in question. If successful, the graphics program will return to the kernel I/O driver which restarts the VDMA process where it left off. Also, as before, it may be possible to handle all of this within the kernel I/O driver.

In sum, the general process by which a page fault is handled is as follows. Initially, a signal from the kernel which is the result of an interrupt from the graphics subsystem is trapped. Then the DMA status register is read to determine the cause of the interrupt (i.e., page fault). The kernel driver may also read this and supply this information directly. Next, the DMA fault address register, which indicates the virtual address which faulted, is read, and the offending pages are touched to cause the kernel to load and map the page. Finally, the I/O driver is called to map the new page into the shadow tables and restart the VDMA at the faulted address.

A similar process may be used when an access violation fault is received except that after the virtual address which faulted is determined, the page with a similar access as that which faulted is touched. If the fault is repaired by changing page permissions and the like so that the touching of the page by the signal handler may be successful, the I/O driver may then be called to map the new pages into the shadow tables and to restart the VDMA at the faulted address. However, if the fault was not repaired, the touch will be unsuccessful, and the kernel will kill the process or send it a different signal. Other recovery actions are also possible within the scope of the invention, but if the particular fault is non-repairable the graphics signal handler will not need to attempt the touch. An appropriate recovery action may be defined instead.

Thus, the access rights to the graphics hardware may be repaired by getting a translation through hardware, by walking the tables, or by calling the kernel to make the appropriate corrections. The present invention accordingly represents a hardware extension to handle a remote memory management unit for the graphics processing unit which accesses the main memory 32 using DMA. The disclosed arrangement has the benefit that when a TLB miss occurs in the DMA processor 222, the kernel of host CPU 20 is not called. Instead, only the shadow address tables are accessed. Also, in accordance with the invention a page fault is fully repaired and VDMA is restarted by the kernel.

Previously, when DMA was initiated only by the kernel, the kernel took care of any data consistency problems. In accordance with the VDMA technique of the invention, on the other hand, the user initiates DMA. Hence, new consistency problems now arise. Namely, there are two types of consistencies to be concerned with. One is the DMA/CPU consistency where the CPU must promise not to alter data until the DMA process has finished with it. The other problem is the consistency of the data between the cache and main memory 32. The present invention may also include means for resolving these consistency problems.

For example, performing DMA operations on data structures while they are still accessible to the applications program is not allowed for solving CPU/DMA data consistency problems, unless the application understands the DMA process and accepts responsibility to not edit such structures until DMA is complete. Hence, the user code on the host CPU 20 should understand the DMA so as to be responsible for the synchronization between edits and DMA activity. Many applications, because they use a direct call to implement a display list, can assume this responsibility. Accordingly, virtual DMA can be enabled by an explicit request from the applications program. Moreover, by enabling DMA, the application code must synchronize with the DMA before editing any of the data which is sent to the graphics process via DMA. One skilled in the art will know how to modify the applications program accordingly.

Because of cache/main memory inconsistencies, on the other hand, in order for any DMA read process to work properly it is necessary for any relevant dirty lines in any caches to be flushed back to main memory 32 as mentioned above before DMA is allowed or else the DMA must be given access to dirty data in the caches. Also, on DMA writes to main memory 32 in accordance with the invention, either the caches are flushed both before and after the DMA executes, or the DMA is allowed to update or invalidate any copies in the cache during DMA.

For example, cache/main memory data consistency may be achieved in accordance with the invention by snooping all accesses to copy-back pages. On DMA writes to main memory 32, any cache hits cause that cache line to be invalidated. On DMA reads from main memory 32, on the other hand, any dirty cache hits cause the cache to supply the data instead of the main memory 32. However, since snooping generally slows down both the CPU and the VDMA accesses, snooping should be avoided whenever possible by the use of write-through pages and explicit flushes. Snooping can be avoided by using dirty data in write-through pages which are already in main memory 32 as long as the DMA start-up is guaranteed to occur after any write buffers are flushed, for VDMA reads from a write-through page do not have to be snooped. By contrast, VDMA writes to a write-through page must be snooped so that any cache copy will be updated or invalidated. Cache consistency can thus be made invisible to user level code. Whether or not to use snooping or user controlled flushing can be left to the discretion of those skilled in the art.

In accordance with a preferred embodiment of the invention, all data read via DMA may be read from write-through pages so that the caches do not have to be snooped. The user's applications program must therefore allocate all display list data in write-through pages. On the other hand, the kernel driver may be programmed to force the user's pages to write-through when VDMA is enabled during direct call mode. For example, the user instruction which enables DMA may also cause the kernel to convert all or part of the applications program's pages to write-through. In addition, since the shadow page tables are a record of which pages the graphics process is trying to access, it is possible to convert only those pages in use by the graphics process, thereby further reducing processing time.

In accordance with other preferred embodiments of the invention, the VDMA host interface 22 may also support snooping on all burst accesses to copy-back pages so that even if the user does nothing but enable DMA, the interface 22 will work without cache flushing. Also, the shadow page tables are preferably kept in write-through pages which are purged before access by the kernel so that updates of the reference and modification bits of the graphics program do not need to be snooped. In addition, DMA writes to main memory 32 may be at write-through pages which are always purged after completion of DMA. This requires that user level code be given a new kernel trap to allow it to purge the data cache.

Thus, to overcome potential data consistency problems for user controlled DMA, the host CPU 20 will preferably implement the following steps. First, after they are completed but before they are swapped, all work buffers 35 will be explicitly flushed to main memory 32 by the applications program. Then, all display list elements should also be explicitly flushed to main memory 32 by the applications program after being edited but before any VDMA is allowed. In addition, before and after they are accessed, shadow page table entries should be explicitly flushed to main memory 32 by the kernel I/O driver. Also, both before and after any frame buffer block reads are executed, the receiving buffer must be flushed to main memory 32 by the applications program. Moreover, before any frame buffer block writes are executed, the source buffer must be flushed to main memory 32 by the applications program, and after VDMA is enabled for direct call the user's data cache should also be flushed to main memory 32 by the applications program.

The VDMA host interface 22 as described above allows an external process such as a graphics subsystem to access data directly from memory. This reduces the bus bandwidth requirements since data travels straight to the graphics subsystem instead of from the main memory 32 to the host CPU 20 and then to the graphics subsystem. As a result, the host CPU 20 no longer must spend its valuable computational time performing routine data copies so that more real work is accomplished and memory bus utilization is increased. The present invention also has the benefit that the host user's level software can initiate direct access to memory using virtual addresses without subrouting calls to kernel services. Such kernel calls are extremely time consuming, and by eliminating the need for such kernel calls in accordance with the invention, normal DMA techniques may now be applied in accordance with the invention to access graphics primitives. The DMA processor 222 also need not implement the full display list traversal function; therefore, the hardware of the invention may be much cheaper and the support software much simpler than implementations which use display list traversal processors. Moreover, in accordance with the invention normal page swapping and other virtual memory functions and protections may be retained.

Although a number of exemplary embodiments of the invention have been described in detail above, those skilled in the art will readily appreciate that many additional modifications are possible in the exemplary embodiments without materially departing from the novel teachings and advantages of the invention. For example, the same virtual memory techniques used in accordance with the invention may be used for an external networking subsystem rather than a graphics subsystem as described. Any other subsystem also may be used in which it is desirable for the user to be able to directly access the data in the main memory without the necessity of interrupting the operating system for each such memory access. Accordingly, all such modifications are intended to be included within the scope of this invention as defined in the following claims.

What is claimed is:

1. An interface device for transferring data associated with data processing commands directly between a user's host system having a main memory and an external data processing system in response to user commands without direct host operating system management during individual memory transfer transactions, comprising:

means for representing said data processing commands and associated data as command/pointer packets comprising said data processing commands and virtual pointers to said associated data in virtual memory space of the user's host system;

means on said interface device, coupled to said virtual memory space, for directly translating said virtual pointers of said command/pointer packets to physical pointers which identify physical addresses within said main memory at which said associated data is located; and means on said interface device for transferring said associated data from and to said main memory at said physical addresses.

2. A device as in claim 1, wherein said external data processing system comprises a communications network.

3. A device as in claim 1, wherein said external data processing system comprises a graphics subsystem of said user's host system.

4. A device as in claim 3, wherein said data processing commands comprise graphics commands and said associated data comprises graphics primitives.

5. A device as in claim 4, wherein said representing means comprises a user applications program operating on said user's host system.

6. A device as in claim 5, wherein said translating means comprises a DMA processor having access to at least one shadow page table updated by a processor driven operating system of the user's host system, said at least one shadow page table containing physical pointers corresponding to said virtual pointers.

7. A device as in claim 6, wherein said DMA processor has a user privileged shadow page table for each user controlled process of said host system.

8. A device as in claim 7, wherein said DMA processor includes a translation lookaside buffer for storing virtual to physical translations found during recent accesses by the DMA processor to said shadow page table.

9. A device as in claim 8, further comprising additional data storage means for storing data, said DMA processor interrupting said processor driven operating system of the user's host system, when said translating means receives an indication that a required translation is not located in the shadow page table, so that said processor driven operating system can operate a fault algorithm for locating and swapping said associated data between said additional data storage means and said main memory, so that the processor driven operating system can then create the required translation and place said required translation into the shadow page table.

10. A device as in claim 7, wherein translations in said shadow page table are created and updated by said processor driven operating system in response to indications from said DMA processor that translations required to access associated data in main memory are not present in the shadow page table in said main memory.

11. A device as in claim 10, further comprising synchronizing means for synchronizing reads and writes of said shadow page table and user's virtual memory space in main memory by said user's host system to reads and writes of said shadow page table and user's virtual memory space in main memory by said transferring means so that data consistency in main memory is maintained.

12. A device as in claim 7, wherein said translating means further comprises a command/pointer packet buffer for sequentially storing said command/pointer packets for parsing by said DMA processor.

13. A device as in claim 7, wherein said transferring means comprises DMA state means responsive to said DMA processor for initiating a read or a write of said associated data from or to said main memory.

14. A device as in claim 13, wherein said DMA state means comprises a register written by said DMA processor to indicate a starting data buffer address for said associated data in said main memory.

15. A device as in claim 14, wherein said starting data buffer address represents a work buffer in said main memory in which said command/pointer packets are stored.

16. A device as in claim 7, wherein said transferring means comprises a bidirectional bus buffer and an input/output bus for connecting said translating means to said user's host system and said main memory.

17. An interface device for transferring graphics primitives associated with graphics commands directly between a user's host system having a main memory and a graphics subsystem in response to user commands without direct host operating system management during individual memory transfer transactions, comprising:

means for representing said graphics commands and graphics primitives as command/pointer packets comprising said graphics commands and virtual pointers to said graphics primitives in virtual memory space of the user's host system;

means on said interface device, coupled to said virtual memory space, for directly translating said virtual pointers to physical pointers which identify physical addresses within said main memory at which said graphics primitives are located; and means on said interface device for transferring said graphics primitives from and to said main memory at said physical addresses.

18. A device as in claim 17, wherein said representing means comprises a user applications program operating on said user's host system and said translating means comprises a DMA processor having access to at least one shadow page table updated by a processor driven operating system of the user's host system, said at least one shadow page table containing physical pointers corresponding to said virtual pointers.

19. A device as in claim 18, wherein said DMA processor has a user privileged shadow page table for each user controlled process of said host system.

20. A device as in claim 19, wherein said DMA processor includes a translation lookaside buffer for storing translations found during recent accesses by the DMA processor to said shadow page table.

21. A device as in claim 20, further comprising additional data storage means for storing data, said DMA processor interrupting said processor driven operating system, when said translating means receives an indication that a required translation is not in said shadow page table, so that said processor driven operating system can operate a fault algorithm for locating and swapping said graphics primitives between said additional data storage means and said memory, so that the processor driven operating system can then create the required translation and place said required translation into the shadow page table.

22. A device as in claim 19, wherein translations between virtual pointers to physical pointers of associated graphics primitives in said shadow page table are created and updated by said processor driven operating system in response to indications from said DMA processor that translations required to access associated graphics primitives in main memory are not in said shadow page table.

23. A device as in claim 22, further comprising synchronizing means for synchronizing reads and writes of said shadow page table and user's virtual memory space in main memory by said user's host system to reads and writes of said shadow page table and user's virtual memory space in main memory by said transferring means so that data consistency in main memory is maintained.

24. A device as in claim 19, wherein said translating means further comprises a command/pointer packet buffer for sequentially storing said command/pointer packets for parsing by said DMA processor.

25. A device as in claim 19, wherein said transferring means comprises DMA state means responsive to said DMA processor for initiating a read or a write of said graphics primitives from or to said main memory.

26. A device as in claim 25, wherein said DMA state means comprises a register written by said DMA processor to indicate a starting data buffer address for said graphics primitives in said main memory.

27. A device as in claim 26, wherein said starting data buffer address represents a work buffer in said main memory in which said command/pointer packets are stored.

28. A device as in claim 19, wherein said transferring means comprises a bidirectional bus buffer and an input/output bus for connecting said translating means to said user's host system and said main memory.

29. An interface device for transferring graphics primitives associated with graphics commands directly between a user's host system having a main memory and a graphics subsystem in response to user commands without direct host operating system management during individual memory transfer transactions, comprising:
   means for representing said graphics commands and graphics primitives as command/pointer packets comprising said graphics commands and virtual pointers to said graphics primitives in virtual memory space of the user's host system;
   means on said interface device for translating said virtual pointers to physical pointers which identify physical addresses within said main memory at which said graphics primitives are located, said translating means comprising a DMA processor having access to a user privileged shadow page table for each user controlled process of said host system, each shadow page table being created and updated by a processor driven operating system of said user's host system in response to an indication that translations required to access graphics primitives are not in said shadow page table so as to contain current translations of physical pointers corresponding to said virtual pointers, and a command/pointer packet buffer for sequentially storing said command/pointer packets for parsing by said DMA processor;
   DMA state means responsive to said DMA processor for transferring said graphics primitives from and to said main memory at said physical addresses; and
   synchronizing means for synchronizing reads and writes of said shadow page tables and user's virtual memory space in main memory by said user's host system to reads and writes of said shadow page tables and user's virtual memory space in main memory by said DMA state means so that data consistency in main memory is maintained.

30. A method for providing direct memory access by an external data processing system to data stored in a main memory of a user's host system in response to a plurality of user's data processing commands without direct host operating system management during individual memory transfer transactions, comprising the steps of:
   representing each of said user's data processing commands and associated data as a command/pointer packet including a virtual pointer to said associated data in virtual memory space of said user in said user's host system;
   directly translating by an interface device said virtual pointer to a physical pointer which identifies a physical address within said main memory at which said associated data is located; and
   accessing said main memory by said interface device at the physical address identified by said physical pointer in order to transfer data to and from said main memory.

31. A method as in claim 30, wherein said external data processing system comprises a graphics subsystem of said user's host system, each of said user's data processing commands is a graphics command and said associated data comprises graphics primitives.

32. A method as in claim 31, wherein said translating step by said interface device includes the steps of:
   performing table lookup in a translation lookaside buffer to find a translation of said virtual pointer to a physical pointer which identifies a corresponding physical address in main memory of the data associated with each of said user's data processing commands;
   when said translation lookaside buffer does not contain said translation, searching a shadow page table in said main memory for said translation;
   if said translation is found in said shadow page table, adding the virtual pointer to physical pointer translation to said translation lookaside buffer;
   writing said corresponding physical address to an address register of a DMA state device; and
   repeating said table lookup step to find a next translation.

33. A method as in claim 32, comprising the further steps of suspending said translating step and transmitting an interrupt to said user's host system when at least one of a memory and a protection fault is encountered during said translating step.

34. A method as in claim 30, wherein said translating step includes the step of checking a shadow page table for a translation of said virtual pointer into said physical pointer.

35. A method as in claim 34, comprising the further step of updating said shadow page table by adding a required translation when at least one of a memory and protection fault is encountered during said translating step.

36. A method as in claim 35, comprising the further step of synchronizing reads and writes of said shadow page tables and user's virtual memory space in main memory by said user's host system to reads and writes of said shadow page table and user's virtual memory space in main memory by said reading and writing step so that data consistency in main memory is maintained.

37. A method for providing direct memory access by an external data processing system having an interface device with a DMA processor to data stored in a main memory of a user's host system in response to a user's data processing command without direct host operating system management during individual memory transfer transactions, comprising the steps of:
   preapproving all direct memory accesses by said external data processing system requested by said user in said user's data processing command by writing a shadow page table root address in the DMA processor;

assembling a plurality of command/pointer packets for each user process, each of said command pointer packets comprising a user's data processing command and a virtual pointer in virtual memory space of the user's host system to data in said main memory for use in processing of said user's data processing commands;

storing each of said command/pointer packets in a buffer on said interface device for sequentially storing said command/pointer packets for parsing by said DMA processor;

parsing each command/pointer packet by said DMA processor to obtain said user's data processing command and said virtual pointer;

writing said user's data processing command to an input of said external data processing system;

translating said virtual pointer into a corresponding physical pointer which identifies a physical address in said main memory at which said data is located, said translating performed by said DMA processor on said interface device by accessing translation information stored in said shadow page table, indicated by said shadow table root address;

determining a word count identifying the word length of said data; and transferring to an input of said external data processing system a number words of said data corresponding to said word count, said data transfer starting at an address in said main memory identified by said physical pointer, said data transfer controlled by a DMA state device responsive to said DMA processor, said DMA state device and said DMA processor located on said interface device.

38. A method as in claim 37, comprising the further step of flushing a cache memory of said main memory before said data transferring step is attempted in order to maintain data consistency.

39. A method as in claim 37, wherein said translating step includes the steps of:

performing table lookup in a translation lookaside buffer to find a translation of said virtual pointer to a physical pointer which identifies a corresponding physical address in main memory of the data associated with each of said user's data processing commands;

when said translation lookaside buffer does not contain said translation, searching a shadow page table in said main memory for said translation;

if said translation is found in said shadow page table, adding the virtual pointer to physical pointer translation to said translation lookaside buffer;

writing said corresponding physical address to an address register of a DMA state device; and repeating said table lookup step to find a next translation.

40. A method as in claim 37, comprising the further steps of suspending said translating step and transmitting an interrupt to said user's host system when at least one of a memory and a protection fault is encountered during said translating step.

41. A method as in claim 37, wherein said translating step includes the step of checking a shadow page table for a translation of said virtual pointer into said physical pointer.

42. A method as in claim 41, comprising the further step of synchronizing reads and writes of said shadow page table and user's virtual memory space in main memory by said user's host system to reads and writes of said shadow page table and user's virtual memory space in main memory by said transferring means so that data consistency in main memory is maintained.

* * * * *

UNITED STATES PATENT AND TRADEMARK OFFICE
CERTIFICATE OF CORRECTION

PATENT NO. : 5,301,287
DATED : April 5, 1994
INVENTOR(S) : Russ W. Herrell, et al.

It is certified that error appears in the above-identified patent and that said Letters Patent is hereby corrected as shown below:

In claim 21, column 22, line 54, after "said" insert --main--.

Signed and Sealed this

Ninth Day of June, 1998

Attest:

BRUCE LEHMAN

Attesting Officer     Commissioner of Patents and Trademarks